3,080,738
SINGLE STATION FUSION MACHINE FOR
MAKING SEMI-CONDUCTOR DEVICE
Henry D. Frazier, Los Angeles, and Pat Wayne Richey, San Fernando, Calif., assignors to Pacific Semiconductors, Inc., Culver City, Calif., a corporation of Delaware
Filed Jan. 12, 1959, Ser. No. 786,150
2 Claims. (Cl. 65—154)

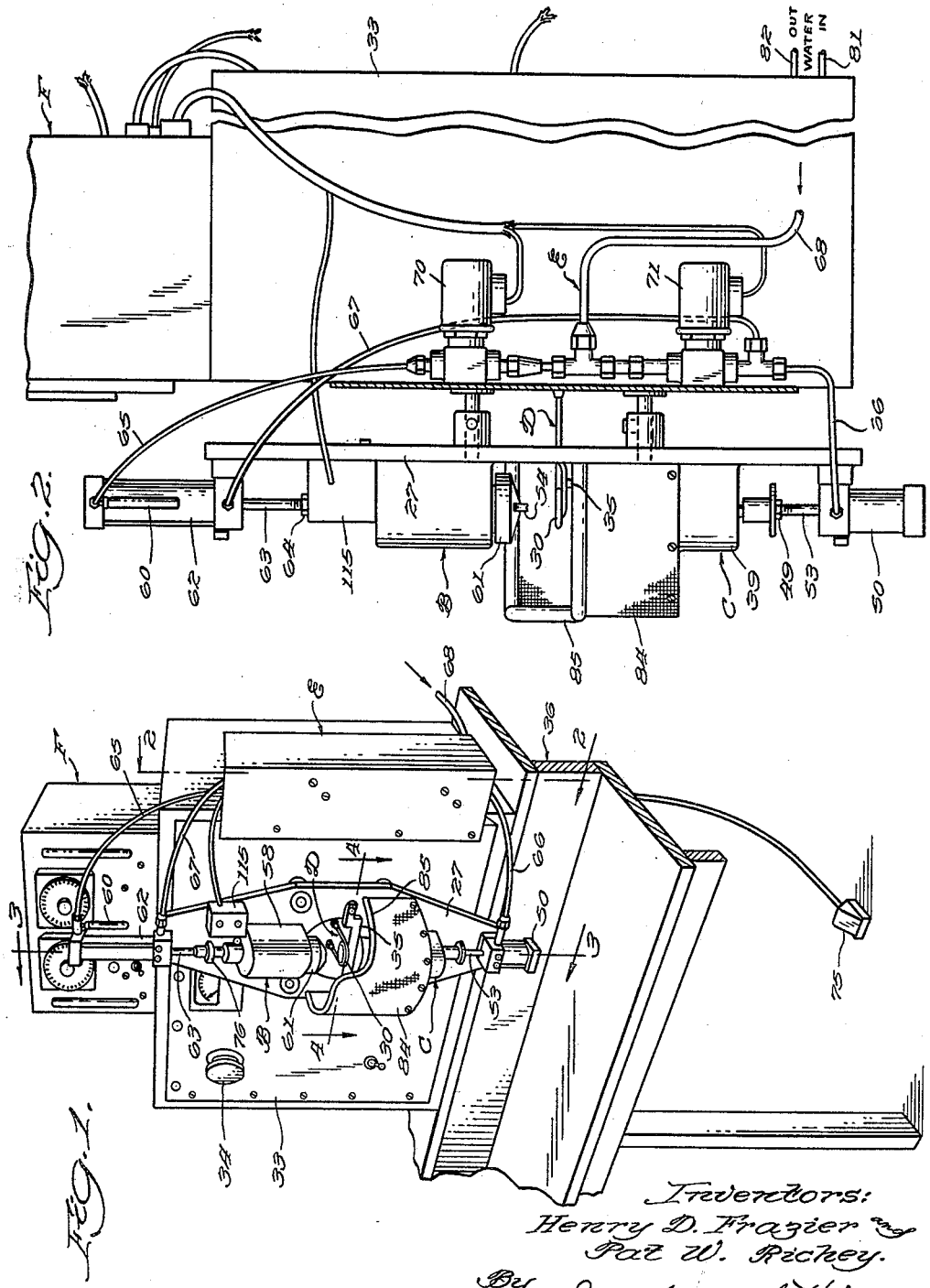

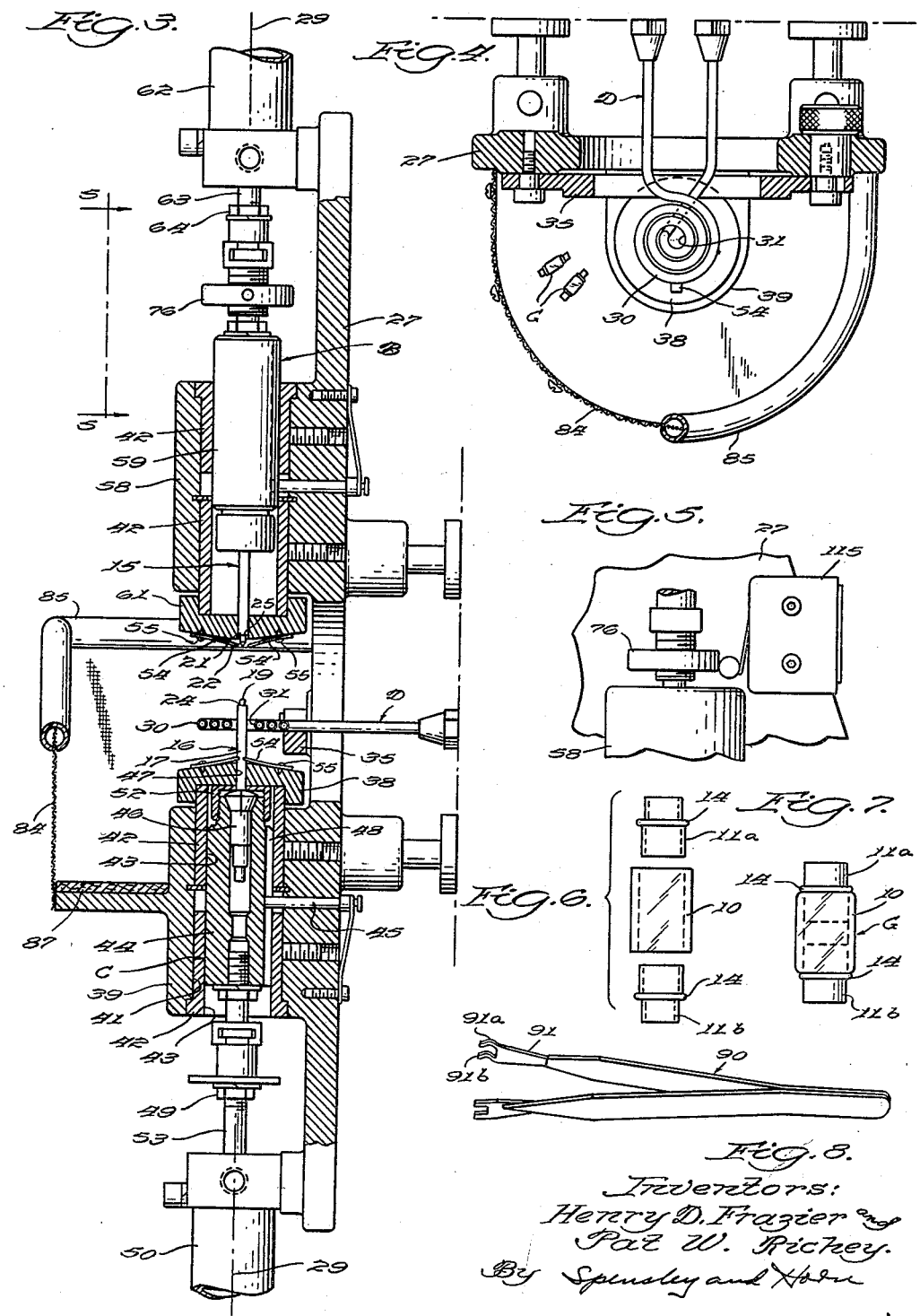

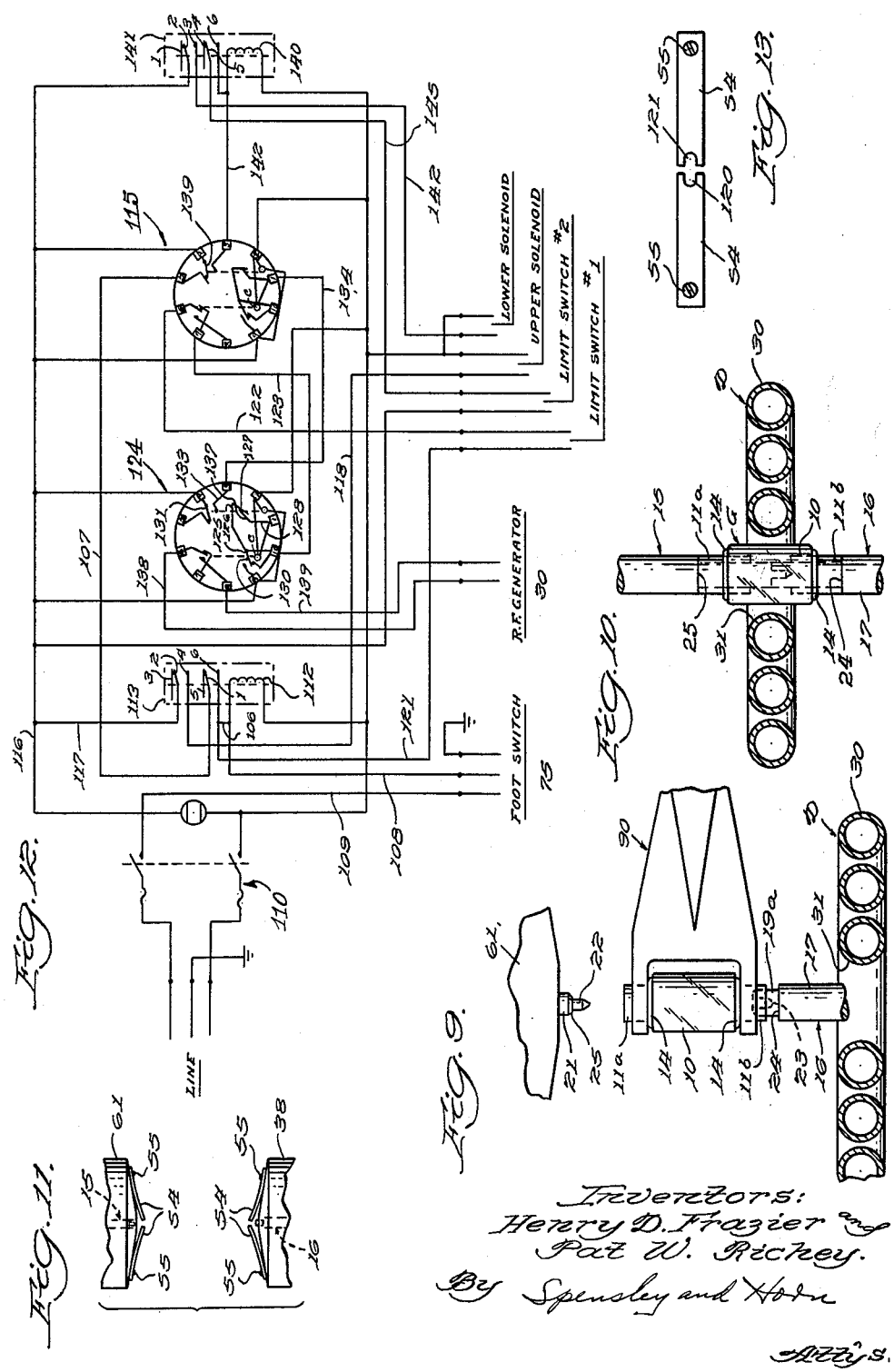

This invention relates to a semiconductor assembly apparatus and more particularly to an improved method and apparatus for assemblying and fusing a glass cylinder between metal parts.

In the production of semiconductor devices such as semiconductor diodes one means of encapsulating the semiconductor device is by using a glass cylinder into each end of which is inserted a metal shell. The glass and metal shells or sleeves are mateable and are fused together to form a hermetic seal. Such an encapsulation envelope is shown and described in United States Patent No. 2,815,474 entitled, Glass Sealed Semiconductor Rectifier by William M. Lewis, Jr. and Henry D. Frazier, issued December 3, 1957, and assigned to the assignee of the present invention. In forming such an encapsulation body for the device, difficulty of assembly is encountered due to the small size of the components and the economic necessity of assembling large numbers during a small period of time. In addition, small tolerances and high standards of manufacture are required.

Accordingly, it is an object of the present invention to provide a method and apparatus for assembling and fusing metal shells into opposed ends of a glass cylinder to produce a semiconductor encapsulating body economically and at great production speed.

It is another object of the present invention to provide a method and apparatus for assembling and fusing an encapsulating body having metal shells inserted into opposed ends of a glass cylinder.

A further object of the present invention is to provide an apparatus for assembling and fusing metal shells into opposed ends of a glass cylinder which apparatus maintains the shells and cylinder in axial alignment and which maintains the finished assembly at the desired length.

Yet another object of the present invention is to provide an apparatus for assembling and fusing such device bodies without shortening, elongating or cracking the glass cylinder.

It is a further object to provide such an apparatus for assembling and fusing the device body with a uniform and efficient hermetic seal between the parts.

A still further object of the present invention is to provide such an assembling and fusing apparatus which requires a minimum of manual or skilled operations.

The present invention is a method and apparatus for assembling and fusing a device body, comprising a glass cylinder into each end of which is inserted a metal sleeve or shell, by supporting the body assembly between two axially aligned mandrels and fusing the components by induction heating. The apparatus of the present invention performs a holding and heating function by positioning the device body components upon a mateable mandrel after which the mandrel and device body are carried into an induction heating coil for fusion of the glass cylinder to the metal sleeves.

The novel features which are believed to be characteristic of the invention together with further objects and advantages thereof, will be better understood from the following description considered in connection with the accompanying drawings in which a presently preferred embodiment of the invention is illustrated by way of example. It is to be expressly understood, however, that the drawings are for the purpose of illustration and description only, and are not intended as a definition of the limits of the invention.

In the drawings:
FIGURE 1 is a view in perspective of an assembled apparatus in accordance with the present invention;
FIGURE 2 is a side view in elevation of the assembled apparatus taken along line 2—2 of FIGURE 1;
FIGURE 3 is an enlarged partial view in elevation of the mandrel assemblies taken along line 3—3 of FIGURE 1;
FIGURE 4 is a partial plan view taken along line 4—4 of FIGURE 1;
FIGURE 5 is a partial view in elevation of the flange and microswitch for actuating the RF generator;
FIGURE 6 is a view in elevation of the glass cylinder and shells which form the device body;
FIGURE 7 is a view of the glass cylinder and shells in the assembled condition forming the device body;
FIGURE 8 illustrates a special gripping tweezers for loading the unfused assembly upon the mandrel;
FIGURE 9 is a partially schematic view of the work coil and mandrels with the mandrels in load position and with the device body components being positioned upon the lower mandrel;
FIGURE 10 is a view similar to FIGURE 9 showing the mandrels and device body in the fusing position;
FIGURE 11 is a view of the stripper caps with the mandrels withdrawn into the unloading position;
FIGURE 12 is a circuit diagram of the presently preferred electrical circuitry of the present apparatus; and
FIGURE 13 is a plan view of the stripper spring associated with the stripper caps shown in FIGURE 3.

Referring now to the drawings, and particularly to FIGURES 1, 2 and 3, the apparatus of the present invention comprises in general an upper mandrel assembly B, a lower mandrel assembly C, an induction heating assembly D, air control apparatus E, and electrical control apparatus F.

As previously described, the apparatus of the present invention performs a holding and heating function to assemble a semiconductor device body of the type shown in FIGURES 6 and 7. The device body G comprises a glass cylinder 10 into each end of which is inserted a metal cylindrical shell 11a, 11b, see FIGURE 6. The shells 11 are formed of metal such as Kovar and are affixed to the glass cylinder by heating the glass to a molten condition with the shells in place as shown in FIGURE 7. The shells 11a and 11b in the embodiment shown have a shoulder 14 which defines the extent to which the shells are inserted into the glass cylinder. The portion of the shells which enter the cylinder have an outside diameter substantially equal to but less than the inside diameter of the glass cylinder. As the glass becomes molten it fuses to the shells and upon cooling the union between the glass cylinder and shells furnishes a hermetic seal. Although the present invention is applicable to various configurations and sizes of device bodies, for purposes of illustration and clarity, the glass cylinder to be assembled in the presently preferred embodiment is .13 inch in diameter, .28 inch in length and with an inside diameter of .09 inch.

Referring now to the upper mandrel 15 and the lower mandrel 16 proper, as shown in FIGURES 3, 9 and 10, the lower mandrel 16 is a rod-like member formed of material having a relatively high melting point such as beryllium-copper tipped with platinum-iridium alloy. The main body portion 17 of the mandrel 16 is cylindrical with an outside diameter in excess of the outside diameter of the shell 11. At the end of the mandrel a portion 19 is reduced in diameter to a diameter substantially equal to but less than the inside diameter of the shell 11. Similarly, the upper mandrel 15 has an outside diameter in excess of the outside diameter of the shells 11 and an end portion 21 of reduced diameter substantially equal to but less than the inside diameter of the shell 11. Means are provided for aligning the mandrels in end to end axial alignment. Thus, in the embodiment shown, a further reduced diameter portion or pin 22 is formed extending axially from the reduced diameter portion 21 of the upper mandrel. A mateable indentation 23 is formed extending axially inward from the outer end of the reduced diameter portion 19 of the lower mandrel. Thus, the mandrels 15 and 16 are axially mateable to form a coextensive cylindrical member with the ends of the reduced diameter portions 19 and 21 abutted to form a cylinder of reduced diameter defined between the shoulders 24 and 25. The distance between the shoulders and therefore the length of the reduced diameter portions 19 and 21 are determined to be substantially equal to the length of an assembled device body G after fusion but a substantial amount less than an assembled body which has not been fused. That is, it can now be seen that if the shell 11b, glass cylinder 10, and shell 11a are placed together in that order upon the reduced diameter portion 19 of the mandrel 16, the mandrels 15 and 16 cannot quite be moved partially into mating engagement and the device in assembled condition will be confined between the shoulders 24 and 25. As described further hereinafter in connection with the description of the apparatus, the complete mating of the mandrels occurs after the glass cylinder has become molten allowing the mandrels to shorten the cylinder to the desired finished length. Thus, prior to fusion the upper mandrel pin 22 extends into the indentation 23 and the mandrels are axially aligned with the shoulders 24 and 25 exerting an axial compressive force upon the body assembly. After the glass cylinder becomes molten the mandrels can move into complete mating engagement at which position the pin 22 extends fully into the indentation 23. Since the ends of the portions 19 and 21 abut at this position substantially no further axial compressive force can be transmitted to the body assembly G.

Means are provided for moving the mandrels 15 and 16 into and out of mating engagement such that when axially mated the portion between the shoulders 24 and 25 and a body assembly G contained at that point, is within a heating field sufficient to make the glass cylinder 10 molten. Accordingly, an upper mandrel assembly B is affixed to a structure plate 27 to position the upper mandrel 15 along an apparatus centerline. The mandrel assembly includes means for moving the mandrel vertically along the centerline as described hereinafter. Positioned beneath the upper mandrel assembly is an induction heating coil 30 affixed to and extending from the plate 27 such that the coil is substantially perpendicular to the apparatus centerline 29 and symmetrical with respect thereto to define a heating field which surrounds the centerline at a diameter in excess of the greatest diameter of the device body G as shown in FIGURES 3, 9, and 10. That is, the coil defines a central opening 31 of the above diameter and the coil has a sufficient heating capacity to make the portions of the glass cylinder 10 which are in contact with the metal shells 11 molten in a predetermined time as discussed hereinafter.

The lower mandrel assembly C is affixed to the plate 27 and spaced beneath the coil 30 a predetermined distance. The lower mandrel assembly positions the lower mandrel along the apparatus centerline and includes means for moving the mandrel vertically through the heating coil and into mating engagement with the upper mandrel as described hereinbefore.

The heating or work coil 30 and the heating assembly D are induction heating means of the type well known to the art. That is, the coil 30 is a high-frequency current carrying conductor which is energized by an RF generator 33 which preferably has a frequency at or above 1.5 mc. to 2.5 mc. The RF generator is controlled by a control unit F which energizes and deenergizes the coil in a programmed sequence as described hereinafter. The RF generator is of the type having a variable power control 34 to adjust the heating intensity within the heating area or fusion zone. The coil 30 in the presently preferred embodiment is designed to provide a maximum amount of clearance between the inside diameter 31 of the coil and the outside diameter of the body G with power requirements near the middle of the RF generator's range. The coil is made of ⅛ inch O.D. copper tubing with three turns and glyptol is used for insulation. The coil is mounted upon the plate 27 by means of an adjustment bar 35 by means of which its vertical and centerline orientation can be varied slightly.

The structural plate 27 upon which the mandrel assemblies and coil are mounted is in turn mounted upon the forward face of the RF generator cabinet, while the controller F housing is affixed above the RF cabinet and the air plumbing E is affixed to one side of the RF cabinet. The complete apparatus is then mounted upon suitable supports 36 (FIGURE 1) to position the coil at an appropriate operating height.

The lower mandrel mechanism is adapted to provide movement of the lower mandrel from a first position or upper position as shown in FIGURES 3 and 9 to a lower position as shown in FIGURE 11. The upper position is the position in which the mandrel is loaded with a glass shell stack. At this position the upper end of the mandrel and particularly the portion of reduced diameter extends through the coil 30 a sufficient distance above to allow loading of the mandrel by the operator. In the presently preferred embodiment the mandrel is extended approximately ¼ inch above the coil and is loaded with special tweezers described hereinafter. The lower position to which the mandrel 16 is moved is such that it is withdrawn into the stripper cap 38 to strip from the mandrel the fused device body G if after fusion it remains upon the lower mandrel. In order to accomplish the movement of the mandrel from the lower to the upper position and vice versa an air-actuated double acting piston 50 is used as the moving means. Thus, referring particularly to FIGURE 3, the lower mandrel assembly C comprises a bracket 39 which is affixed to or forms an integral part of the structural plate 27. The bracket 39 defines a cylindrical opening 41 therethrough which is vertical and symmetrical about the centerline 29 of the apparatus. Suitable bearings 42 are positioned and affixed within the cylindrical opening 41 to define a cylindrical bearing surface 43 which is also symmetrical with respect to the apparatus centerline 29. Vertically movable retaining means such as the collet adapter 44 is mateable with and slidably movable within the vertical bearing 43. The collet adapter is thus a cylindrical piston having a central opening therethrough with which a collet 46 is mateable. The collet is of the type well known to the art and in turn has a longitudinal opening into which the lower mandrel 16 may be inserted. The collet is in turn inserted into the collet adapter 44 and is tightened by a collet closer 52 which is a female threaded cap mateable with male threads upon the upper end of the collet adapter 44. By inserting the mandrel 16 into the collet and tightening the collet closer by threading it downward upon the collet adapter, the mandrel is positioned symmetrically with respect to the centerline 29 and is held in position on the centerline and also longitudinally. In the embodiment shown, a longitudinal spline 48 is formed in the collet adapter and a retaining pin 45 is extended through the wall 27 into engagement with the spline to prevent rotation of the collet adapter 44. Thus, the collet adapter 44 is vertically slidably movable within the bearings 42. At the upper end of the bearing 42 there is provided a stripper cap 38 which is stationary and which defines a central opening 47 through which the mandrel 16 is vertically slidable. Thus, the bracket 39, the bearings 42 and the stripper cap 38 are stationary while the collet adapter 44 and the collet and mandrel carried thereby are vertically movable. A piston rod 53 is affixed to the lower end of the collet adapter 44 through an adjustable lower coupling 49. The piston rod is in turn connected to the piston within the double acting air cylinder 50 and is vertically moved by movement of the piston. The lower air cylinder 50 is affixed to the structural plate 27 symmetrically about the centerline 29 of the apparatus and is of the type of double acting air cylinder which is well known to the art. In the presently preferred embodiment an air cylinder having a one inch stroke is utilized and the cylinder is such that the piston and piston rod are extended by a spring within the cylinder when no air pressure is present at either side of the piston. Thus, as shown in FIGURE 3, the normal non-actuated position of the air cylinder is such that the piston rod 53 is fully extended and the mandrel is at its upper position. Since the upper and lower position of the piston rod 53 is fixed by the air cylinder the upper and lower positions of the mandrel relative thereto are adjusted by means of the adjustable lower coupling 49 which connects the piston rod to the collet adapter. By such adjustment the desired upper position of the lower mandrel 16 can be made coincident with the upper or extended position of the air cylinder and piston rod 53. Conversely, the position of the stripper cap is determined such that the lowermost position of the piston rod carries the mandrel to the lower position described hereinbefore. Accordingly, the mandrel 16 is moved from the upper position to the lower position by admitting air under pressure to the upper side of the air piston within the cylinder 50 and is assisted from the lower to the upper position by admitting air to the lower side of the air piston. The sequence by which the air is admitted to the desired side of the air cylinder is determined by the control unit as described in detail hereinafter. Stripper springs 54 are affixed at the upper side of the stripper cap 38 to remove a device body G from the mandrel as the mandrel descends into the lower position with a device body positioned at the upper end thereof. The stripper springs 54 in the presently preferred embodiment are leaf springs with indentations at the inner end thereof, which indentations are determined such that they surround the mandrel 16 at the full diameter portion 17 but will engage the larger diameter of the device body G if it attempts to pass by the stripper springs 54. Thus, the stripper springs 54, a plan view of which is shown in FIGURE 13, includes two substantially semi-circular openings 120 and 121 near the ends thereof opposite the ends which are fastened to the stripper caps. The diameter of the semi-circles must be greater than the mandrels but less than the O.D. of the body being fused. The stripper springs are designed such that they are affixed to the stripper cap at affixing points 55 and are raised slightly above the surface of the stripper cap at the center part thereof. Thus, they are bent slightly downward when engaged by a device body and the resiliency of the springs flip the body upward after the mandrel passes beyond the springs and into the stripper cap.

The upper mandrel assembly B is similar in many respects to the lower mandrel assembly C in that an upper collet adapter 59 engages the upper mandrel 15 in the same manner as previously described to position, and affixes the mandrel 15 on the centerline 29 while carrying the mandrel from an upper to a lower position. The collet adapter 59 is again slidably movable within bearings 42 which are in turn retained within an upper bracket 58. An upper stripper cap 61 and stripper springs 54 are affixed at the lower end of the bearings 42 and are similar in configuration and function to the lower stripper cap previously described. Thus, the collet adapter 59 carries the upper mandrel 15 from an upper position as shown in FIGURE 11 to a lower position as shown in FIGURE 10. The upper position is a retracted position at which the mandrel is retracted into the opening of the stripper cap which, together with the stripper springs removes a device body from the upper mandrel if the device body has remained attached thereto. The lower or extended position of the upper mandrel 15 is such that the lower mandrel is mated and engaged by the upper mandrel as previously described and is carried into the fusion zone. As previously discussed, the upper position of the lower mandrel is at a substantial distance above the fusion zone surrounding the horizontal plane through the coil 30, while the lower position of the upper mandrel positions the mandrel area of the reduced diameter, i.e., between the shoulders 24 and 25, symmetrically within the fusion zone. Accordingly, it may be seen that with a device body G loaded upon the lower mandrel 16 above the coil 30, the upper mandrel 15 in its downward stroke will engage the lower mandrel and the shell subassembly of the device body at the load position of the lower mandrel and will continue downward carrying the device body and lowered mandrel into the fusion zone. Thus, toward the end of its downward stroke, the upper mandrel is acting against the upward force of the lower mandrel to carry the device body into fusion zone. Upward and downward movement of the upper mandrel are again obtained by means of a double acting air cylinder 62 which is affixed to the structural plate 27 with the air cylinder centerline coincident with the centerline 29 of the apparatus. An upper piston rod 63 extends from the air cylinder 62 and is coupled to the collet adapter 59 through an adjustable upper coupling 64 by means of which the upper and lower position of the upper mandrel 15 which are desired can be obtained from the upper and lower position respectively of the piston rod 63. The upper air cylinder utilized in the presently preferred embodiment is again a double acting air cylinder with a two inch stroke and with a spring return to the upper position of the piston rod, and thus to the upper position of the mandrel, such that the relaxed position of the air cylinder maintains the mandrel in its upper position. Again, downward and upward movement of the mandrel is obtained by admitting air under pressure to the upper and lower side respectively of the piston within the cylinder 62. The sequence and time at which such air is admitted is controlled by the control unit as described hereinafter. The rate of descent and rise of the upper mandrel are controlled by means of a bleeder type regulator 60 of the type well known to the art which is connected into the first air line 65 to the upper side of the piston in the upper air cylinder 62. Thus, the bleeder regulator is of the type which is adjustable to pass air at a desired pressure to the top of the piston in the cylinder from an air pulse of fixed pressure in the line 65.

The air actuating and control system includes a second air line 66 to the lower air cylinder at the upper side of the piston therein such that air admitted to the cylinder forces the piston and mandrel 16 downward against the spring pressure. A similar third air line 67 extends to the upper cylinder 50 at the lower side of the piston to force the piston upward when air is admitted through the line 67. As discussed hereinbefore, the first air line to the upper side of the piston in the upper cylinder is connected through a bleeder regulator. Air is admitted to the respective air lines from a source of compressed air (not shown) through the air inlet line 68 in a controlled sequence by means of solenoid actuated valves 70 and 71. The solenoid actuated valves are in turn actuated by the controller unit F described hereinafter. As shown particularly in FIGURE 2 the second and third air lines 66 and 67 are connected to the air outlet side of the second valve 71. Thus, when the second valve 71 is opened air is admitted simultaneously through the lines 66 and 67 to move the lower mandrel downward and to move the upper mandrel upward. Thus, the air inlet line 68 in which air is maintained under pressure is connected through suitable fittings to the inlet side of both solenoid actuated air valves 70 and 71. The first air line 65 to the upper side of the piston in the upper air cylinder 50 is connected to the air outlet from the first valve 70. Actuation of the solenoid of the first valve 70 thus admits air to the upper end of the upper cylinder to force the mandrel 15 downward at a rate controlled by the bleeder regulator 61.

As discussed hereinbefore, the induction heating used to fuse the glass and Kovar shells is of the type well known to the art which utilizes the transfer of electrical energy from a high frequency current carrying conductor, usually referred to as a work coil, as a means of raising the temperature of metallic parts. In the present invention, since the metallic shells extend into the glass cylinder, the subassembly when positioned within the heating coil is heated at those glass areas which are proximate to the metal shells to cause fusion of the metal and the glass. The heating coil is energized by a suitable power source which sets up a field of magnetic flux that energizes the metal shells and mandrel in such a way that current is caused to flow around the surfaces thereof. The resistance of the work to this flow, or its inability to carry the induced current, causes an immediate heating action to take place.

The sequence and time intervals for the various operations of the present apparatus are controlled by the control unit F. The controller and its corresponding circuitry contain the electronic components in a suitable cabinet, external circuits on the frame of the machine consisting primarily of micro-switch and solenoid controls, and circuitry within the high frequency induction heating unit. Control of the external circuits and the induction heater is accomplished by the electronic controller. In general, the controller for the fusion machine consists of two adjustable reset timers and two relays in the presently preferred embodiment, all of which are chassis mounted and installed in the cabinet as shown in FIGURE 2. In addition to the solenoids which actuate the air valves, the controller accurately times and sequences the steps necessary in the body fusion assembly operation. The time intervals with respect to the work coil are the heat cycle, which is the time at which fusion takes place, and the cool cycle, which is the time delay after fusion and before the removal of the parts from the mandrel. The timers utilized in the presently preferred embodiment comprise a constant speed motor, a friction clutch, and a cam and microswitch timing mechanism, all of which are well known to the art and which are not shown mechanically in detail. Such timers are commercially available, as for example, the Atcotrol timers manufactured by the Timetrol Co. of Van Nuys, California. The motor runs continuously and is clutched to the timing mechanism by energizing a clutch coil from an external source. When the clutch coil is energized, the timing cam starts rotating at a constant speed and continues until it actuates a micro-switch at the end of its travel. When the clutch coil is released the timing cam returns to its rest position which is adjustable from the front panel of the controller. The time delay can be adjusted by varying the rest position of the timing cam. The clutch coil also controls an armature which actuates timer contacts which have been energized at the start of the timing cycle.

Referring now to FIGURE 12, there is shown a circuit for controlling the heat-cool cycle in accordance with the present invention. Initially, switch 110 is closed connecting the circuit to a source of power, not shown. Switch 110 is a single throw double pole manual switch which is mounted on the front panel of the machine. In operation, with switch 110 closed, the operator manually steps on foot switch 75 thus causing current to be drawn from the source over lead 109, through the foot switch 75 and lead 108 to coil 112 of relay 113. This energizes the relay 113 causing its movable contacts 1 and 2 to transfer from stationary contacts 5 and 3, respectively, to stationary contacts 6 and 4, respectively. With contacts 1 and 6 thus connected, current is drawn from the power source over lead 116, through normally closed contacts 4 and 5 of cool timer 115 and through lead 107. Contact 6 of relay 113 is further connected to coil 112 by means of jumper 106; thus relay 112 will remain energized throughout the cool cycle, that is, as long as contacts 4 and 5 of cool timer 115 remain closed, despite the fact that the operator no longer has his foot upon the switch 75. At the same time, contacts 1 and 6 of relay 113 close, contacts 2 and 4 thereof will also close thus completing a current path to the upper mandrel coil over leads 116, 117, and 118. This current energizes the solenoid which actuates the upper mandrel valve 70 to apply air under pressure to the upper cylinder above the piston to actuate the upper mandrel downward into the fusion area. As the upper mandrel passes downward and approaches the end of this downward stroke, the flange 76 above the hold adapter engages the normally open micro-switch 115a as shown in FIGURE 5, which acts as a limit switch.

The closing of contacts 1 and 6 of relay 113 as previously discussed, also provides a current path to a normally open limit switch No. 1 over lead 121. When this switch closes, current passes over lead 122 to normally closed contacts 6 and 7 of cool timer 115 and through lead 123 to contact 10 of heat timer 124. This causes a number of events to occur simultaneously as follows. Current flows to terminal 125 over lead 126 to contact 127 through micro-switch 132 (which is located internally within timer 124), and through arm 128 to contact 1. This current flow energizes the clutch coil, not shown, but designated by the letter C, of the heat timer 124. Energization of the heat timer clutch coil C closes contacts 6 and 8 of timer 124. This path is closed throughout the predetermined heat timing interval and opens only at the end of this interval to allow the internal timing cam (not shown) to come to its rest position.

At the completion of predetermined time interval of timer 124 to micro-switch 131 and 132 located internally therewithin will actuate by a sweeping arm (not shown) associated with the timer causing contact 4 to make contact with contact 3 over arm 133 which results in the starting of the clutch operation of timer C by its clutch coil C which draws current over lead 134 to terminal 1 of cool timer 115. Approximately 90 milliseconds later contact arm 137 of heat timer 124 opens releasing the clutch coil thereof thus completing the heat cycle. This also opens contacts 6 and 7 of timer 124. During the heat cycle, of course, with contacts 6 and 8 of heat timer 124 making contact with the RF generator work coil 30 is actuated over leads 138 and 139.

The clutch coil C of cool timer 115 upon energization previously explained opens 6—7 and 9—10. The opening of contacts 6 and 7 assures that timer 124 cannot be started in operation by the accidental depression of the foot switch 75 during the cool cycle. The closing of contacts 9 and 10 serves to assure the supply of current to clutch coil C of cool timer 115 until completion of its predetermined time cycle. At the end of this predetermined time cycle terminal 139 associated with contact 4 breaks contact with contact 5 and makes contact with contact 3 thus energizing coil 140 of relay 141 over leads 116 and 142. This closes the contacts 2 and 3 of relay 141 thus passing current to the lower mandrel solenoid over lead 142. The contacts of relay 141 will stay closed for 80 to 90 milliseconds to apply power to the solenoid of the second actuated air valve 71 momentarily retracting the lower mandrel which then returns to the upper or load position described hereinbefore. This is assured as at the same time current is drawn by the lower mandrel solenoid over lead 142, current is drawn over lead 145 through contacts 5 and 6 of relay 141 to the normally closed limit switch No. 2. This switch serves to keep relay 141 closed assuring the lower mandrel solenoid operation by keeping current in coil 140 long enough for the lower mandrel to operate as previously described. Approximately 90 milliseconds after contacts 3 and 4 close terminals 1 and 10 thereof will disengage releasing the coil clutch current of timer 115 thus completing the cool cycle. Mechanical means are used to strip the fused body from the mandrels as described hereinbefore. At the end of the electrical sequence described above, the upper mandrel is retracted and the lower mandrel is in position for reloading and recycling.

In addition to the air and electrical circuitry described hereinbefore, suitable water piping is provided to cool the various parts of the apparatus and particularly those parts with which the operator of the apparatus is likely to come into contact. Thus, water is circulated into and out of the apparatus proper through water tubing 81 as an inlet and 82 as an outlet. A grid or guard 84, as shown in FIGURES 1 and 4, is positioned around the heating coil to prevent operator contact, and a water cooled member 85 is utilized to surround the grid and maintain it in a cool condition.

Referring now to FIGURE 8, special tweezers are utilized to load the shell-glass-shell assembly upon the lower mandrel above the heating coil when the lower mandrel is in its uppermost position. A presently preferred embodiment of such loading tweezers is shown in FIGURE 8. These tweezers 90 define at the holding end a slotted finger 91 which is curved at a radius of curvature similar to the radius of the shells 11a and 11b. The finger is split into spaced apart holding regions 91a and 91b with the space therebetween being substantially equal to the length of the cylinder. Thus, a shell-glass-shell subassembly may be gripped by the tweezers and held in an assembled condition while it is mounted upon the mandrel 16.

Accordingly, the mechanical sequence of operation is as follows. An unfused device body subassembly comprising shells 11a and 11b inserted into opposed ends of a glass cylinder 10 are gripped by the special tweezers 90 and placed into position on the lower mandrel 16 of the apparatus, as shown in FIGURE 9. At this time the lower mandrel 16 is in the position as shown in FIGURE 3 at which it extends above the upper surface of the work coil 30 sufficiently to allow placement of the unfused device body subassembly. After the device body is placed in position, the apparatus is actuated by depressing the foot switch 75, at which time the controller F actuates the solenoid of the upper cylinder air valve 70 to admit air to the upper cylinder above the piston. The piston and the upper mandrel 15 are then forced downward at a rate which is controlled by the rate control bleeder 60. As the mandrel descends, the pin 22 and the area of reduced diameter 21 extend into the device body subassembly as described hereinabove. The mandrel further descends and pushes the lower mandrel 16 and the device body subassembly G into the fusion heating zone. As it descends the flange 76, FIGURE 5, closes the micro-switch 115 and actuates the RF generator through the controller F to begin the heating cycle of the work coil. After the heating and cooling cycle time has expired as governed by the controller F, the controller actuates the solenoids of the air valves 70 and 71 to close the first valve 70 and open the second valve 71 to admit air to the lower cylinder above the piston and to the upper cylinder below the piston respectively. This causes the pistons to retract into the cylinders and to raise the upper mandrel and lower the lower mandrel, as shown in FIGURE 11. If the device body remains in position on either the upper or lower mandrel it is removed therefrom by the stripper springs 54 as described hereinbefore. The device body then falls into the grid area 84, FIGURE 4, where it comes to rest upon an asbestos platform 87. The apparatus is then in position for the loading of the next device after the lower mandrel has been returned to the load position by the spring pressure of the lower cylinder, as shown in FIGURE 8. It should be noted as discussed in connection with FIGURE 12, that when the upper mandrel 15 descends and carries the device body subassembly G into the fusion zone the proper heating cycles are activated. Thus, as the device body G enters the fusion zone the mandrels are still slightly separated from their final position as discussed hereinbefore. As the glass becomes molten, the lower mandrel reaches its lowermost position and the glass cylinder 10 is shortened to its final dimension. After the heating time has expired, a cooling cycle is utilized as discussed hereinbefore, to allow the glass cylinder to cool and harden at the desired final dimensions.

Although a shell-glass cylinder-shell assembly for semiconductor devices has been described throughout as an illustrative application of the present invention it will be apparent in view of the foregoing that the apparatus is useful in other applications for fusing glass and metal assemblies in aligned relationship. Thus use of self-aligning mandrels which carry an unfused assembly into a fusion heating zone and work the glass while in a molten condition makes possible the assembly of glass and metal devices of varying configurations. It should be further noted that the apparatus of the present invention makes possible the arrangement of assembly stations in such a way that one operator can operate two or more assembly stations at the same time. Thus, the present invention provides a method and apparatus for assembling and fusing metal shells into opposed ends of a glass cylinder to produce a semiconductor encapsulating body. The apparatus is economical and provides economical and fast production of such device bodies. The hermetic sealing of the glass and metal shells can be accurately controlled together with the final size and finished specifications of the body. That is, the components of the device body to be fused are maintained accurately in alignment and proper relative orientation during the fusion operation. In addition, the apparatus requires a minimum of skilled operation.

What is claimed is:

1. Apparatus for assembling and fusing a semiconductor device assembly having metallic cylindrical sleeves inserted into opposed ends of a glass cylinder to assemble and fuse said assembly at a predetermined longitudinal dimension comprising: first and second mandrels, each of said mandrels having a reduced end portion, said reduced end portion defining a transversely extending shoulder on said mandrel, said reduced end portions being insertable axially into mating engagement with said assembly at one end and at the opposite end of said assembly respectively, said shoulders being of sufficient transverse area to abut said respective ends of said assembly; an axially extending pin provided at the end of said first mandrel, an axially extending socket defined at the end of said second mandrel, said pin being axially mateable with said socket to axially align said mandrels within said assembly, said shoulders of said mandrels being spaced from said ends of said mandrels by a predetermined distance such that said shoulders are spaced apart by a distance equal to the predetermined length of said device when said ends are in abutted mated relationship; mandrel carrying means for supporting said mandrels in axially aligned relationship; means for moving each of said mandrels from an open first position to a closed second position, said shoulders in said second position being abutted against said respective ends of said assembly, said mandrels being axially aligned with said pin mated with said socket; means for exerting a continuous compressive force upon said assembly between said shoulders in said second position; means for moving said mandrels in said second position to a heating third position; heating means axially surrounding said assembly in said third position whereby said assembly is used and compressed axially to said predetermined length; and means for opening said mandrels to said first position after fusion to remove said assembly therefrom.

2. Apparatus for assembling and fusing a semiconductor device assembly having metallic cylindrical sleeves inserted into opposed ends of a glass cylinder, wherein the sleeves extend from opposite ends of the glass cylinder with a shoulder on the sleeves bearing upon the ends of the cylinder, to fuse said assembly at a predetermined longitudinal dimension comprising: first and second mandrels, each of said mandrels having a reduced end portion, said reduced end portion defining a transversely extending shoulder and a transverse end surface on said mandrel, said reduced end portions being insertable axially into mating engagement with said assembly at one end and at the opposite end of said assembly respectively, said shoulders being of sufficiently transverse area to abut said respective ends of said assembly; a pin provided at the end of said first mandrel extending axially from said end surface thereof, a socket defined at the end of said second mandrel extending axially inwardly from said end surface thereof, said pin being axially mateable with said socket to axially align said mandrels within said assembly, said shoulders of said mandrel being spaced from said transverse end surfaces by a distance equal to said predetermined length of said device when said transverse end surfaces are axially abutted; mandrel carrying means for supporting said mandrels in axially aligned relationship; means for moving each of said mandrels from an open first position to a closed second position, said shoulders in said second position being abutted against said respective ends of said sleeves, said mandrels being axially aligned with said pin mated with said socket; means for exerting a continuous compressive force upon said assembly between said shoulders in said second position; means for moving said mandrels in said second position to a heating third position; heating means axially surrounding said assembly in said third position whereby said assembly is fused and compressed axially to said predetermined length; and means for opening said mandrels to said first position after fusion to remove said assembly therefrom.

References Cited in the file of this patent
UNITED STATES PATENTS

| | | |
|---|---|---|
| 2,422,324 | Watrous | June 17, 1947 |
| 2,452,652 | Hansen | Nov. 2, 1948 |
| 2,491,631 | Wall et al. | Dec. 20, 1949 |
| 2,522,949 | Jarman | Sept. 19, 1950 |
| 2,553,749 | Clark et al. | May 22, 1951 |
| 2,575,448 | Haas | Nov. 20, 1951 |
| 2,813,374 | Bouwman et al. | Nov. 19, 1957 |
| 2,877,603 | Wahlman | Mar. 17, 1959 |